COLOR TELEVISION CAMERA STABILIZING CIRCUIT

Filed Nov. 25, 1952

INVENTOR
BY Robert J. Stahl
Lippincott & Smith
ATTORNEYS 2,779,817

COLOR TELEVISION CAMERA STABILIZING CIRCUIT

Robert J. Stahl, Redwood City, Calif., assignor to Color Television Incorporated, San Carlos, Calif., a corporation of California Application November 25, 1952, Serial No. 322,383

15 Claims. (Cl. 178—5.4)

The present invention relates to circuitry for use with color television camera equipment and particularly color television camera equipment of the type set forth and described in various applications for United States Letters Patent filed by the present applicant and Norman L. Heikes. Of these applications this invention is concerned particularly with circuitry improvements for use with the camera equipment set forth and described in applications for U. S. Letters Patent, Serial Numbers 259,193 and 259,195, each filed November 30, 1951.

In connection with the operation of television cameras used particularly for translating optical images into signal outputs usable for the recreation of color television images, various forms of devices have been proposed. The present applicant, jointly with Normal L. Heikes, proposed and set forth in the above named applications for United States Letters Patent a form of camera arrangement whereby a camera tube of the so-called "image orthicon" type may be used with appropriate unsaturated color filters of strip formation through which the light of the image is directed upon the camera tube. Various forms of circuits usable for the purpose were disclosed in order that the output signals from the camera tube which resulted from a scanning of the target electrode of the tube, upon which electrode the effect of the illumination of the light sensitive target was manifested, could be so utilized as to develop signals indicative of image scanning in selected component colors of a tricolor, for instance, red, green and blue. In addition, there were obtainable also from the signal output other signals indicative of the image in high definition and substantially in black-and-white which signal repetition could also be identified by the commonly known term of "mixed-highs" frequently mentioned in the art.

In such a camera pick-up tube the light image is directed upon the light sensitive area through an unsaturated type of color filter. With this filter there is also imaged on the camera tube a tracking filter. The tracking filter preferably consists of alternate transparencies and opacities (or at least strips of different light-transmitting characteristics) by which, as a result of scanning the target, it is possible to derive, as explained in the above named applications for United States Letters Patent, not only information as to the color, but also information as to the rate of the color scanning.

In the analysis of a scene into color components according to the proposals in the copending applications for United States Letters Patent hereinabove identified the objective is accomplished by the aid of unsaturated color filter strips formed of components of the three additive primary colors, red, green and blue. The strips repeat cyclically. Any given color combination (excluding white in a pick-up equalized on an equal energy basis) will bring about the development of a video frequency signal equal to the rate of scanning these colors, each cycle of which consists of one each of the three selected component or primary colors. In the scanning operation the phase of the video frequency developed will depend upon the hue being scanned. The amplitude of the video frequency so developed is a function of the degree of saturation in any one of the selected component or primary colors. A maximum amplitude is reached at times when any one of the colors is a pure primary or component color. As may be recognized, this of course will mean complete saturation in the scene being scanned at the particular instant. The amplitude is a minimum for white, which will be recognized as complete desaturation of the various colors.

The color filter strips are of a height such that when imaged upon the light sensitive area of the camera tube they shall occupy a height substantially coinciding with one dimension of the image. The width of each strip is such that the long dimension of the focused image shall be divided (for present standards of 525 line pictures repeated at 60 interlaced fields each of 262½ lines per second) into approximately 651 color filter strips or 217 color cycles.

The tracking filter preferably has its individual strips of a width equal to that of any one color strip so that a 3/2 relationship may be maintained between the tracking and color repetition frequencies. This is not an essential operating condition but is mentioned as affording high fidelity operation with simpler equipment and circuitry than if other relationships were chosen.

When camera tubes of the image orthicon type are subjected to extremely high intensity illumination, such as is frequently encountered from highly reflecting surfaces, they are subject to overloading or saturating. When this condition occurs there results almost immediately an approach to almost complete insensitivity of the tube in such high reflecting areas. While the tube soon recovers its normal state of operation with the removal of the cause the sensitivity remains low until recovery is realized—a very short instant after the cause of insensitivity is removed.

Some of these tube effects are discussed in the text "Storage Tubes" by Knoll and Kuzan, and published by John Wiley & Sons, Inc., New York, in 1952. In a camera tube operation of the type herein to be described it is important for proper functioning of the color control and phasing circuits that there be continual receipt of color tracking information during the scanning operation. With insensitivity of the tube resulting in certain areas there is always a danger that the accuracy of tracking in areas immediately following the areas of decreased sensitivity will be diminished due to loss of tracking signal and therewith will be the attendant reduction in color fidelity.

The disturbance due to the operating condition of the camera tube above noted, and what might be considered a tube defect under certain conditions, could be minimized if it were possible to preserve the magnitude of earlier signals which immediately precede the insensitive regions of the tube. By making such signals hold until such time as a tracking signal of adequate signal strength can be reinstated by normal operation adequate tracking is maintained. To this end regenerated earlier signal information from a previously scanned line of the picture is made available. One way to achieve this result is by a delay line having a delay characteristic of one line of picture scanning (for instance, with a 525-line picture scanned at 30 frames per second a delay of 63.5 microseconds) coupled in proper phase between the output and the input of an earlier signal amplifier. The signal developed under such conditions is then used to maintain substantially correct tracking relationship through the instantaneously insensitive region of the tube and is made to be usable in this capacity for several scanning lines by recirculation of this information.

For operating conditions to be encountered in practice it is frequently desirable also to employ a phasing section in the tracking filter image, consisting of a reference color projected upon the over-scan portion of the camera raster, since no picture is present in this area and it is possible then to minimize the cumulative effects and provide color phase. Color phase may be defined as the angle between the 4 m. c. signal from the sync generator and a 4 m. c. signal developed by a selected reference color, for example, red.

Considering the foregoing operational conditions the present invention has as one of its main objects that of providing correct color phase in a convenient manner through the use of circuitry which will not unduly complicate the overall operation of the color signal developing apparatus. In one convenient form of the operation, the camera tube developing the video signal output indicative of color supplies its output signal to the color signal handling circuits of the character described in detail in the above mentioned applications for U. S. Letters Patent, filed by this applicant and Norman L. Heikes. A part of the signal output is also supplied to an appropriate phasing discriminator circuit where the phase of the color signal is compared with that of a standard signal source of control frequency corresponding to that of the optimum frequency for the color repetition cycle. Such a signal is obtainable from the color sync signal generator of the transmitter (herein reference is made particularly to the above mentioned application for U. S. Letters Patent, Serial No. 259,195). The phase discriminated signals which appear in the output of the phasing discriminator are then fed to a suitable phasing gate, the opening and closing of which is controlled by a keying signal occurring at the selected scanning line frequency. This control signal also is developed in the above described sync signal generator. The output signal from the gate is then supplied, preferably, to a suitable phasing storage circuit having a time constant long compared to line scanning rate and is available from that point to control appropriate mixing apparatus, the reasons for which utilization will later appear.

A part of the camera output signal is also supplied through an appropriate band pass filter, the pass band of which peaks at the selected tracking frequency rate. Selected signals occurring at the tracking frequency rate are then discriminated against other signals developed locally in the sync signal generator and controlled so as to occur at precisely the desired optimum tracking frequency, illustratively at a 3/2 value of the color cycle frequency. Output voltages from the discriminator will then be represented by voltages of one polarity (for instance, positive), or the other (for instance, negative), depending upon whether the tracking signals developed at the camera lead or lag in phase with respect to the accurately developed local signals. The signal output from the discriminator is then supplied to separate high impedance signal developing elements (such as pentode tubes or even high value resistors), so as to energize one or another of a pair of unilateral conducting elements, the signal output of which is supplied to a storage circuit having a time constant which is usually selected being of the same order as a scanning line period.

This voltage then is supplied to the same mixer which receives the output from the phasing storage circuit. The combined output from the mixer is then supplied to the camera tube tracking coil to control supplementarily the deflection rate. Frequently it is desirable to take a portion of mixer output voltage and feed this voltage back to the mixer input by way of a delay line introducing a delay of a time period corresponding to one line of scanning (with present television standards at 63.5 microseconds delay period) into the finally produced signal.

Because, as above mentioned, the camera tube is frequently subject to either or both saturating or overloading effect with high illumination with the results that there is considerable danger that the tracking function may be lost due to the failure of receipt of continual indications of the tracking state, it frequently becomes desirable, when the error signal itself is lost, to provide the effect of a holding of a previous state of scanning for so long a time period as reduced output from the camera tube persists. To achieve this result a triggering circuit, of which a circuit known generally as a "Schmitt trigger" is suitable, is connected to the output of a band pass filter, wherein signals of the tracking frequency appear to control the signal to the storage circuit, which supplies the mixer. This "Schmitt trigger" (or any other suitable triggering component to achieve a like result) is arranged to function as a gate controlling circuit of such a character that whenever the tracking signal falls below a selected critical or threshold amplitude the signal input to the storage circuit is interrupted and the mixer is caused to depend for its functioning upon a so-called "memory" voltage derived from a previous state of operation.

There are various ways and means by which the general principles of operation hereinabove outlined can be achieved. The broad features are set forth herein for purposes of generally explaining the invention. Further reference to particular embodiments will be set forth in the description of a complete embodiment later to follow.

However, with these thoughts in mind, at this time it will be appreciated that the present invention seeks to provide circuitry by which the effects of camera tube saturation and overloading during periods of high intensity illumination, such as might be had when the camera tube is focused particularly upon an object having high reflective properties, such as a mirror, are minimized or completely nullified.

Other objects of the invention are those of providing circuit refinements usable with camera control apparatus of the type mentioned in the above identified applications for U. S. Letters Patent which can readily adapt themselves for incorporation in such apparatus as has heretofore been known without requiring a complete revision of the operational circuitry previously proposed.

Further objects of the invention are those of providing control circuitry which will minimize the effects of insensitivity of a camera tube for conditions of extremely high intensity illumination so that color fidelity may be retained.

Still further objects of the invention are those of providing switching circuits capable of operating to insure the desired degree of control of a piece of controlled apparatus or circuitry, with the switch between one condition of operation and another, such as the controlled and the uncontrolled state, adapted to occur substantially instantaneously and to be maintained during selected time periods when the condition which initiated the operation, such as the need for the compensation desired, continues to persist. Still further objects are those of providing accurate and automatic control of color phase under wide variations in operating conditions.

Additional objects of the invention over and above those outlined include the provision of compensating circuits of minimum complexity which are usable with heretofore proposed forms of circuits and apparatus and yet which operate with extremely few component parts so that cost increase to provide high fidelity operation is but of a nominal amount only over and above the initial cost of the complete unit.

The invention is illustrated in one of its preferred forms by the accompanying drawings of which;

Figures 1, 2:
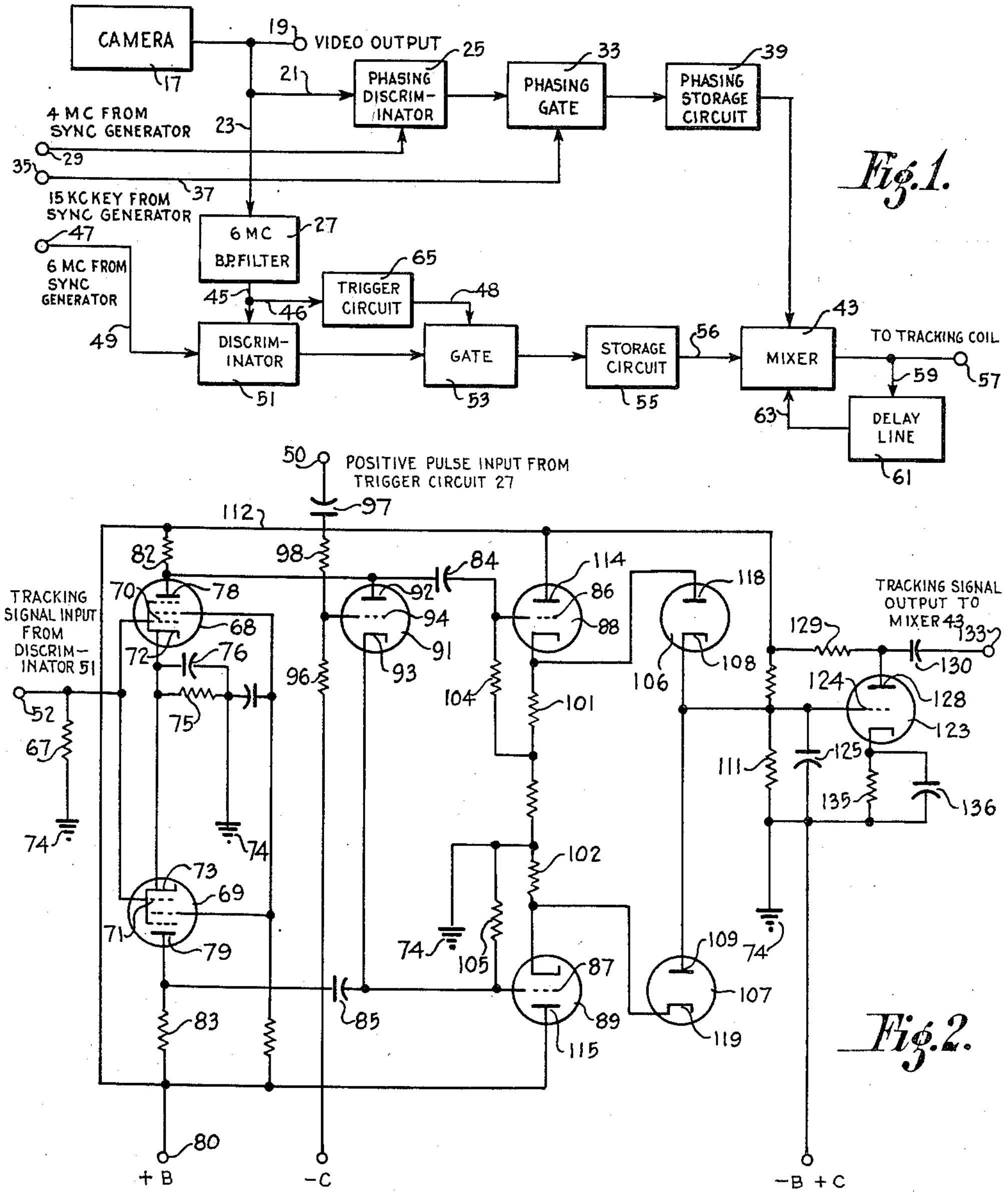
Fig. 1 is a block diagram of a schematic form circuit.
Fig. 2 illustrates in detail a portion of the circuit of Fig. 1 particularly usable as a part of the gate and storage circuit operating to provide and insure accurate tracking during periods of camera tube insensitivity.

Referring, for a further understanding of this invention, first to the diagrammatic representation of Fig. 1 the camera tube and its various associated amplifiers and filters for developing the video signal outputs, as described in the above named applications for U. S. Letters Patent, is schematically shown at 17 from which the output video signals become available at the terminal point 19. The output video signals are intended to be utilized, for instance, particularly in the manner described in connection with the above mentioned application for U. S. Letters Patent, Serial No. 259,193. As such, the signal output from the camera apparatus 17 will also be available on the conductor 21. There, also, it will include information concerning the rate of tracking of the color image filter (not shown) in the camera tube. As was proposed in the application for the U. S. Letters Patent last named, the tracking frequency may be selected at will but it preferably should be selected for the first simplified operation at the 3/2 value of some appropriate color repetition cycle frequency. In the example illustrated in the last named U. S. application for Letters Patent, Serial No. 259,193, this color cycle was assumed at 3.969 megacycles per second. A choice of this frequency value is purely arbitrary. Various other proposals have been made for the established color cycle frequency, among which is one where the color cycle repeats at a rate 3.58+per second, with an alternative proposal having selected the color repetition cycle at a value of 3.89+ megacycles per second. With the value of the color cycle repetition frequency selected illustratively at 3.969 megacycles per second, it can be seen that when the tracking frequency occurs at the 3/2 value of this assumed standard, the tracking will be controlled by a wave repeating at 5.9535 megacycles per second. This, for general reference purposes, will be identified and referred to herein as a 6.0 megacycle tracking frequency in order to simplify frequency designation. Likewise, the assumed 3.969 megacycle color repetition frequency will be referred to herein as a 4.0 megacycle color cycle frequency, again for simplification of explanation.

The same output signal available at the terminal point 19 is also supplied upon the conductors 21 and 23 to the phasing discriminator 25 and to the 6 mc. (megacycles) band pass filter 27 (this filter is actually peaked to 5.935 mc., which is the tracking frequency). The phasing discriminator 25 may be of any standard form customarily used to discriminate phase differences between two signals. The phase discriminator is conventionally represented and may be any type of unit which responds to indicate a phase change of one input voltage thereto relative to another such voltage. One suitable form of such device includes among other circuit components a pair of diode elements to which one control voltage is supplied in push-pull fashion to the tubes, with the other control voltage being supplied in push-push fashion to the same tubes, so that the output is indicative of a relative phase change. Discriminators of this general type have found use in television circuits and particularly in certain early models such as that known as the RCA type 630TS television receiver. However, in the circuit used herein the reactance tube of the television receiver need not be used since the other circuits herein serve to supply its function.

In the illustrated example of Fig. 1 the frequency stabilized voltage indicative of the color cycle becomes available from the sync signal generator (not shown) and is supplied at the terminal point 29, and thence via conductor 31 to the phasing discriminator 25. The signal voltage will occur at the selected color repetition frequency herein proposed illustratively 3.969 mc. rate, with any change in the color frequency actually developed in the camera with respect to that phase or rate at which it should occur being measured and determined by the departure from the sync signal generator output voltage. Herein a departure in one direction, say that due to scanning too rapidly tending to increase the color cycle repetition rate relative to normal herein being termed "negative." Any change in the color cycle repetition rate which is the result of scanning slower than optimum will herein be called a "positive" signal. That output signal which results from the phasing discriminator 25 measuring the so-called "positive" and "negative" voltages is then supplied to the phasing gate 33.

The signal input from the phasing discriminator 25 to the phasing gate 33 is "gated" therethrough under the control of highly stabilized signals occurring at line frequency and developed at the sync signal generator (not shown). These "gating" signals are supplied at the terminal point 35 and reach the gate 33 via conductor 37 to open this phasing gate for their duration. In television operations this time is not more than 14% of a line period.

The phasing gate circuit is shown only diagrammatically in Fig. 1. It may be any appropriate form so operating that the receipt of one signal is required to open or "gate" it in such a way as to permit the other signal to become effective at the output of the gate. In this instance signals in the form of signal pulses at line frequency open the gate for a short period at the beginning of each scanning line (in the overscan region of the camera), so as to permit the output of the phasing discriminator, which has provided the indication of any possible phase differences between the actually developed reference color signals from the phasing section of the tracking filter and the highly stabilized color repetition frequency developed at the sync generator, to pass beyond the gate and into the phasing storage circuit conventionally represented at 39. Various forms of gate or switch circuits for this purpose are well known, but among those forms which are suitable reference may be made to the text, "Waveforms," by Chance and others, published by McGraw-Hill Co., Inc., 1949, and particularly to the chapter 10 entitled "Time Selection" starting at page 364 of the text.

The phasing storage circuit conventionally represented at 39 has a relatively long time constant, which may be set, for instance, at approximately $2\times10^{-2}$ seconds. The unit comprises preferably any suitable form of integrating circuit of which one of the more common forms comprises a combination of capacity and resistance elements in parallel. Suitable forms of integrating circuits are indicated illustratively in the above referred to text, "Electron-Tube Circuits" by Seely on page 129 thereof, as well as the type of diode detector circuit shown at page 346 of the same text, and are also shown in other forms at page 599, and in the chapter starting at page 502 of the text "Radio Engineering" by Dr. F. E. Terman, published by McGraw-Hill Book Co., Inc., in 1947.

These examples are merely illustrative of what are well known in the art as suitable operating circuits. In this connection various forms which the band-pass filter component shown at 27 may assume are also described and explained in the text "Radio Engineering" by Terman, above identified, and particularly in that portion of the text commencing at page 69.

The output from the phasing storage circuit 39 is supplied by way of conductor 41 to a mixer unit 43, the nature and purpose of which will later be explained herein.

It was above pointed out that the tracking information in the assumed example occurs at a frequency of approximately 6 megacycles per second with 6 megacycle designation being that which will be referred to herein illustratively for the precise assumed frequency of 5.9535 megacycles per second. Consequently, the output of the band-pass filter 27 available on the conductor 45 will consist principally of signals occurring at the tracking frequency. There is also available from the sync generator signals of the precise tracking frequency. These signals which are stabilized in accordance with desired operating conditions are available at the input terminal 47, and herein assumed illustratively as the 6 megacycle signal source. The signal output from the band-pass filter 27 available on the conductor 45 and the stabilized signal pulses of the tracking frequency available at the input terminal 47 and upon the conductor 49 are both fed to the discriminator 51. This is a discriminator unit of any suitable form of such a type that it will discriminate against a frequency or phase difference between the two signals and thus serves to compare the signal output from the filter 27 with the stabilized tracking frequency pulses available at the input terminal 47. Generally the discriminator 51 may be of the form shown and explained as the phasing discriminator 25 but designed for a different operating frequency. Under conditions of operation where tracking signals of at least a selected threshold amplitude are available at the output of the camera 17 to discriminator output is fed through a gate circuit 53, later to be explained, particularly in connection with Fig. 2 hereof, so as to energize a storage amplifier circuit conventionally represented at 55, also later to be explained in connection with Fig. 2.

The storage circuit 55 preferably has a shorter time constant than that of the phasing storage circuit 39 and illustratively may have a time constant of the order of $2\times10^{-4}$ seconds. This time constant circuit is connected with the input of an amplifier (shown particularly in Fig. 2) whose output supplies the mixer 43 by way of the indicated conductor 56. Later reference will be made to the action of the mixer 43, but for the moment let it be assumed that the signal output of the phasing storage circuit 39 and the tracking storage circuit 55 are mixed and supplied at terminal 57 so as to be available for controlling the current flow through a tracking coil to accelerate or decelerate the scanning rate in the camera 17 in a fashion supplementary to the normal deflection, as was explained in the above mentioned copending applications for United States Letters Patent.

In order to provide a feedback from the mixer output to the mixer input, whereby the general effect of signal regeneration may be had, a portion of the mixer output is supplied by way of conductor 59 to the conventionally represented delay line 61 and the output from this delay line is then supplied to the mixer input by way of conductor 63. The delay line 61 has a delay characteristic corresponding to one line of the picture to be reproduced. It has already been mentioned herein that for operating standards of a 525-line picture repeated in 60 interlaced fields of 262½ lines each per second, the time for scanning one line may be considered as corresponding to 63.5 microseconds.

As the operation has been explained hereinabove, the gate 53 may be considered to be open during operating conditions when there is sufficient signal output from the camera tube at the tracking frequency to make possible discrimination between it and the stabilized tracking frequency signal from the sync generator as available at the terminal 47. However, during the scanning of insensitive areas of the camera tube, which areas come into being for short time periods at different areas of the tube for reasons above noted, there results a reduction in the amplitude of this tracking signal during the scanning of such areas. Were the operation to be contingent upon a comparison between an extremely weak signal and a signal of the precise tracking frequency, it will be appreciated that the very weak signal would soon lose control and the operation would be governed only by the sync generator and not by the operation actually occurring with the scanned camera tube. During retrace the same conditions obtain. It is at these periods that the hold-over control becomes important and to this end it then becomes important that the gate 53 be closed so as absolutely to arrest the control of the mixer 43 from the discriminator 51 in order that the tracking effect maintained as a result of scanning areas of high sensitivity in the camera tube can be achieved. For this purpose there is indicated in Fig. 1 a connection between the output of the band-pass filter 27 and the gate 53 through a triggering component 65, which may be suitably termed a "Schmitt trigger." A trigger circuit of this type is explained in some considerable detail in the text "Time Bases" by O. S. Puckle, published by John Wiley & Sons, Inc., in 1943, with a description of such a type circuit commencing at page 57 of the said text. Essentially the so-called "Schmitt trigger" circuit is one which has two stable limiting conditions. It consists essentially of two back-coupled triodes which have direct couplings. The arrangement is such that with a strong signal output from the band-pass filters 27 supplied to the conductor 45, and thus into the input of the Schmitt trigger, by the conductor 46 the Schmitt trigger 65 will supply, in the illustrated example, a negative control pulse by way of conductor 48 to the gate 53 such that the gate will remain open. However, at periods of extremely weak tracking signal outputs from the camera tube 17, resulting in a similar weak signal applied to the input of the Schmitt trigger 65, the circuit is intended to operate in such fashion that a positive pulse is applied to the gate 53, as will be explained in more detail in connection with Fig. 2, in such a way that the gate closes. Description of the operation of the Schmitt trigger in any further detail is believed to be unnecessary in the light of the explanation of this type of circuit in the Puckle text. Let it suffice, therefore, to mention that the limiting condition of operation in this circuit, as used in combination with the other circuit components of Fig. 1 hereof, is such that with a weak signal input the assumed output potential is in the positive sense, while for a strong signal input the opposite stable limiting condition is attained and a negative output becomes available on the conductor 48.

With the foregoing general description of the circuit components comprising this invention, reference may now be had to the particular form of gate circuit control whereby the output from the discriminator 51 is supplied to control the mixer 43 or whereby the operation of the mixer 43 is so controlled that the operation from the discriminator output is interrupted and the control is from a signal which is actually a repetition of some condition previously occurring.

Considering now particularly the operation and functioning of the gate component 53 and the storage circuit 55 together with its appropriate amplifier, mention of which was made in the discussion of Fig. 1, it will be seen by referring to the circuit of Fig. 2 that the various components are more particularly exemplified. The output from the Schmitt trigger unit 65, as available on the conductor 48, is supplied at the terminal input point 50, it being borne in mind that the threshold of the trigger 65 is so adjusted that each cycle of the output of the band-pass filter 27 which is of greater amplitude than some suitable selected minimum will retrigger the circuit within its quasi-stable period, but a cycle of less than the selected threshold amplitude will not trigger the circuit. The result is that an output pulse becomes available at the terminal 50 upon the trigger returning to its so-called normal state. This pulse is utilized to control the opening of the gate 53. With the gate 53 open the error signal passes between the discriminator 51 and the mixer 43. At times when the tracking signal at the output of the band pass filter 27 is less than the selected threshold value, the gate 53 will close and prevent the signal output from the discriminator 51 reaching the storage circuit 53 so that the charge accumulated by the tracking storage circuit 55 will remain unaltered except for such leakage as is due to the grid circuit of the following mixer stage. With a return to a normal operating condition in the camera tube (that is, a condition where the tracking signal exceeds the selected threshold value) indicating that there is a recovery of the camera tube from its insensitive state. The cycle of operation of the Schmitt trigger 65, above explained, is reversed and the error signal from the output of the discriminator 51 is once again applied through the storage circuit 55 and the mixer 43 to control the camera tube tracking coil (not shown). This control is applied as a result of the signal voltage available at the terminal 57.

In the consideration of Fig. 1 it may be noted that no provision is made for removing the phasing error signal according to the fashion proposed for the tracking signal.

This is because of the fact that the phasing signal itself is not particularly subject to alteration from the excessive scene brightness. Under some circumstances the phasing signal can actually assist materially in maintaining operation precision during weak tracking signals because of this general immunity to alteration. It is partially for this reason that the time constant of the phasing storage circuit 39 is made long (often by a factor of 100 to 1) with respect to the time constant of the tracking storage circuit 55. The long time constant provides sufficient storage in the phase error channel to retain the necessary information during vertical or field blanking. By providing a low impedance output the phasing gate 33 can impress relatively rapidly changing charges across the phasing storage circuit 39.

With the foregoing general features in mind the output from discriminator 51 is made available at the input terminal point 52 (see Fig. 2) and is supplied across the resistor component 67 to two parallelly connected high impedance current sources, such as the diagrammatically represented pentode tubes 68 and 69. It will, of course, be apparent that under some conditions a high resistance might be utilized, if amplification of the incoming signal at the terminal point 52 is not essential. The important characteristic is that the pentode type tube, illustrated by Fig. 2, is selected because it is an amplifier tube possessing a high plate resistance. The incoming signals available at the input terminal 52 are applied in parallel to the grid or control electrodes 70 and 71 of these pentodes. The tube cathodes 72 and 73 are connected together and to ground at 74 by way of the biasing resistor 75 connected to the cathode and suitably by-passed by the condenser 76. The plates or anodes 78 and 79 receive plate voltage from a source (herein not shown) connected to be poled positive at the terminal point 80 and supplying the plates through appropriate plate resistors 82 and 83. The anodes or plates of the tubes are coupled in conventional fashion by way of the coupling condensers 84 and 85 to the grid or control electrodes 86 and 87 of a pair of cathode follower tubes 88 and 89 respectively, except for the control action effective by way of a gating tube 91 connected with its plate or anode 92 and its cathode 93 connected respectively across the output of the two high impedance sources, illustratively shown as the pentodes 68 and 69. The gating tube 91 has its control electrode 94 suitably biased from a source (not shown) connected with its negative terminal turned toward the terminal point 95 and supplying a cut-off bias upon the tube through the grid resistor 96.

The gating tube 91 is so arranged that when a positive pulse from the trigger unit 65 (Fig. 1) is available at the terminal point 50 and supplied to the tube control electrode 94 by way of the coupling condenser 97 and the decoupling resistor 98, the effect of the cut-off bias supplied to the terminal point 95 is overcome and the tube 91 is then adapted to draw plate current.

Passing now from the consideration of the gating tube 91 and for the moment considering that it is in a cut-off state, it will be seen that with the cathode follower connection output for the tubes 88 and 89 there is available across the cathode resistor 101 of the tube 88 and across the cathode resistor 102 of the tube 89 a potential which corresponds in polarity to that applied to the grid or control electrodes 86 and 87, respectively, so long as conduction occurs through the tubes 88 and 89. Suitable bias is applied to the tube 88 and 89 by way of the grid resistors 104 and 105. A pair of switching diodes 106 and 107, respectively, is connected in such fashion that the cathode 108 of diode 106 connects directly to the plate or anode 109 of the diode 107. Output voltages developed as a result of current flow through the diodes 106 and 107 then become available across the parallel combination of resistor 111 and capacitor 125 of which one terminal connects to the junction between the cathode 108 and the anode 109 and the other terminal of which connects to ground 74. Suitable plate or anode voltage for the cathode follower tubes 88 and 89 is supplied from the terminal point 80 by way of the conductors 112 and 113 connecting to the plate or anode elements 114 and 115 respectively of these tubes. The output voltages from the cathode follower tubes 88 and 89, as developed across the cathode resistors 101 and 102 respectively, are then applied to the anode or plate 118 of the tube 106 and the cathode 119 of the tube 107, respectively.

In accordance with current flow through either of the diode elements 106 or 107 a voltage drop is caused to occur through the capacitor 125 and relatively high resistance 111 forming the grid resistor for an amplifier tube 123 having its grid or control electrode 124 connected to that end of resistor 111 which is, in turn, connected to the cathode 108 and the anode 109 of the diodes 106 and 107, respectively. Consequently, current flowing from the diodes will tend to charge the condenser 125 connected between the grid or control electrode 124 and ground 74 so that the polarity of charge accumulated in it depends upon which of the two diodes 106 and 107 happens to be conducting as a result of the signal potential available at the terminal 52 from the discriminator 51.

Likewise, the amplifier tube 123 will pass current in accordance with the signal voltage supplied to its grid or control electrode 124. This amplifier should preferably operate "class A" with its mid-point of operation chosen for a condition of zero input voltage at the terminal 52. The tube 123 is provided with plate or anode voltage by way of connecting its plate or anode 128 to the high potential conductor 112 through the plate or anode resistor 129. Output voltages from the tube 123 as developed across the plate resistor 129 are then supplied through the coupling condensor 130 to the output terminal 133 to which the conductor 56 (see Fig. 1) leading to the mixer unit 43 is connected. The tube 123 is appropriately biased by the cathode resistor 135 and the bypass conductor 136.

Considering now the operation of the circuit of Fig. 2, and assuming that the gating tube 91 is biased to its cutoff state, it will be seen that an input signal voltage at terminal 52 will be applied to both of the pentodes 68 and 69 in parallel. The voltage available at the output of each of these pentodes is then supplied to the grid or control electrodes 86 and 87 of each of the cathode follower tubes 88 and 89. A voltage of similar polarity to that available at the grid or control electrode input of the cathode follower tubes 88 and 89 is supplied to the anode of one diode 106 and 107 and to the cathode 119 of the other diode.

If it be assumed that the input polarity of the signal voltage available at terminal 52 is positive (+) the potential available at the output of each of the tubes 68 and 69 will be negative (−) in sign. This polarity signal will then be transferred to the grid or control electrode of each of the cathode follower tubes 88 and 89 and a similar negative polarity signal voltage will be applied to the anode 118 of the diode 106 and to the cathode 119 of the diode 107. For this operation and signal polarity current flow will be arrested in diode 106 but supported in diode 107 with a result that the output of amplifier 123 will decrease and indicate for instance that the scanning operation is too fast relative to the optimum rate. Conversely, if the input signal polarity is negative (−) at the terminal 52 it will be appreciated that the polarity of the signal voltage on the control electrode or grids 86 and 87 of the tubes 88 and 89, respectively, become positive. This results in the application of a potential to the diode anode 118 which is positive relative to the tube cathode 108 with the result that diode 106 will pass current. However, at this time, the potential at the cathode 119 is raised relative to the anode or plate 109 so that the diode 107 ceases to pass current. At such time periods, due to the fact that current flow through the diode 106 and is interrupted in its flow through the diode 107, the potential on the grid or control electrode 124 of the tube 123 becomes positive (+) relative to its previous state and the current flow through the tube 123 increases. At this time the potential of the plate or anode 128 tends to decrease so that the potential available at the terminal 123 is reduced with respect to its preceding state which tends to slow the rate of scanning deflection in the camera tube and indicates that the scanning operation in the camera was faster than the optimum rate.

In the operation so far explained it has been assumed that the gating tube 91 has been held at its cut-off state, in which case the assumed threshold value of the tracking signal has been exceeded. If, however, a positive pulse is available from the output of the trigger unit 65 and applied to the terminal point 50 to become effective at the grid or control electrode 94 of the gating tube 91, and this positive potential is sufficient to overcome the cut-off bias on the tube applied from the terminal point 95, the potential at the grid or control electrode 87 of the cathode follower tube 89 will be raised or increased. Similarly, the potential applied to the grid or control electrode 86 of the upper cathode follower tube 88 will be decreased. Since the cathode voltages available at the tubes 88 and 89 will be similar to the grid voltage so long as conduction through the tube continues, the positive potential available at the terminal point 50 and applied to the grid or control electrode 94 of the gating tube 91 will cause the plate or anode potential of the upper switching diode 106 to be reduced and the cathode potential of the lower switching diode 107 to be increased. This change in the respective anode and cathode potentials of these diodes relative to their cathodes will cause the diodes 106 and 107 simultaneously to become non-conducting, assuming, of course, that the voltages concerned are sufficient to overcome the diode conduction due to the tracking signal and the cathode follower output voltage difference available at the point. At time periods when the switching diodes 106 and 107 are simultaneously rendered non-conducting the tracking error signal present at the cathodes of the two cathode follower tubes 88 and 89 is effectively disconnected from the storage circuit comprising the condenser 125 and the grid resistor 111. Where the time constant of the storage circuit (this is the circuit schematically represented at 55 in Fig. 1) is long compared to the period of scanning of one line, the voltage applied to the grid or control electrode 124 of the amplifier tube 123 will remain essentially unaltered during the period that tracking information is removed by the gate.

In the normal and contemplated operation of any television system the extent of the insensitive areas of the camera tube will seldom exceed a small fraction of a scanning line. Consequently, a time constant of the order of 0.0002 second will be adequate. In a circuit of this nature the resistance 111 of the storage circuit, including the resistor 111 and the capacitor 125, may be merely the net leakage resistance due to the paralleled leakages of the amplifier grid circuit, the switching diode output circuit, the storage capacitor and the associated wiring. A resistance as high as this value indicated is permissible in the grid circuit of the amplifier tube 123 because the low output resistance of the cathode followers is generally connected to the amplifier grid except for the relatively short periods of opening of the gate occasioned by conduction within the gating tube 91.

It is important in the consideration of the invention herein set forth that the switching operation takes place abruptly. The use of the diodes 106 and 107 as electronic switches in the circuit described is particularly advantageous from the standpoint of minimizing switching transients and maintaining low impedance during conduction. Because of the fact that voltages of opposite polarity are supplied by each of the cathode followers during gating any stray switching signal effects in the two switching diodes 106 and 107 tend to cancel. It will be appreciated further from what is herein stated that in some instances the switching diodes may be replaced by other unilateral conductors, an example of which might be a germanium rectifier.

Essentially, the result sought to be achieved by what is set forth is that of providing an input circuit for each unilateral conductor which operates in such phase that it will control the operating bias on the unilateral conductor to achieve the results desired, and also it is important that the signal input to each diode be derived from a common source but supplied thereto through separate impedances such as the high impedance signal source provided by the pentodes 68 and 69 and that the gating tube 91 which is adapted to control the operation shall shunt these separate impedances.

From what has been herein stated it will be appreciated that further modifications and control arrangements are fully within the scope of the disclosure hereto attached, such modifications, for example, being of such a nature that the signaling control of the trigger unit 65 may be varied or that the high impedance sources to supply the diode control voltages may be changed, or that the diodes shown may be changed to other forms of unilateral conductors. Components herein diagrammatically indicated are per se well known and need not be described in further detail. With these understandings, it will be appreciated that in the mixer unit 43 (which is any well known form of mixing device) the signal output from the phasing storage circuit 39 is mixed with that indicative of the tracking errors, or that output which represents a previous state of operation, being as it were, substituted for the actual error signal during periods of insensitivity of the camera tube and caused to control the mixer during this time period. Lastly, the control of the tracking coil may be provided in a more effective fashion by a recirculating action incurred through the use of the feed-back to the mixer through a delay line of a one-scanning line period by which the mixer output is fed back to the mixer input for repeated usage. The control to the tracking coil of the camera tube is provided by using an auxiliary deflection to supplement the normal deflection during the scanning operation.

Although high and low impedance elements are specified herein for the signal supply and the gating tube, respectively, it is to be understood that these represent preferred operating components. Other combinations of impedance units should be apparent to those skilled in the art.

Having now described the invention, what is claimed and desired to be secured by Letters Patent is the following:

1. A switching circuit comprising a pair of unilateral conductors of which the cathode of one is connected to the anode of the other, a terminal point connected to the junction of the anode and cathode connection of the unilateral conductors for obtaining a signal output therefrom, high impedance signal input source means connected to each unilateral conductor to supply a common input signal thereto and for one polarity of input signal supply a control voltage to permit current flow through one of the unilateral conductors and for the opposite polarity of input signal supply a control voltage to permit current flow through the other of the unilateral conductors and a gating tube having a low internal impedance relative to the signal input source connected in parallel to the high impedance signal input sources, said gating tube being responsive to a control signal and adapted in one state of conduction simultaneously to bias the unilateral conductors to arrest current flow therethrough.

2. The switching circuit claimed in claim 1 comprising, in addition, a trigger circuit to control the gating tube operation.

3. The switching circuit claimed in claim 2 wherein the high impedance source comprises a pentode tube.

4. A switching circuit comprising a pair of diodes having the cathode of one connected to the anode of the other, a load circuit connected to the junction of the connected anode and cathode elements, a plurality of high impedance devices each connected to receive the same signal input, a connection to supply signals from one high impedance signal source to the unconnected anode of one diode and a connection to supply signals from the other high impedance source to the unconnected cathode of the other diode so that for one polarity of signal input to the high impedance signal sources one diode is adapted to conduct and for the opposite polarity of signal input to the high impedance signal sources the other diode is adapted to conduct, a gating tube having its output circuit connected between the outputs of each high impedance signal source, and means to control the operative and inoperative periods of the gating tube so that for one state of operation of the gating tube one or the other of the diode elements conducts and passes current in accordance with the signal input polarity and for the other state of operation of the gating tube a bias voltage is applied simultaneously to each diode to arrest current flow to the load circuit.

5. A switching circuit comprising a pair of unilateral conductors of which the cathode of one is connected to the anode of the other, a terminal point connected to the junction of the anode and cathode connection of the unilateral conductors for obtaining a signal output therefrom, a signal input to each unilateral conductor including in each path a high impedance signal source with one signal source connected to supply control voltages to the cathode of one unilateral conductor and the other signal source connected to supply control voltages to the anode of the other unilateral conductor so that for one polarity of a common signal input to the high impedance signal sources current flows through one unilateral conductor and with the other polarity of signal input current flows through the other unilateral conductor, a gating tube having a low internal impedance relative to the signal input source connected in parallel to the high impedance signal input sources, a trigger circuit to control the operative and inoperative periods of the gating tube, and means effective in one operational state of the gating tube simultaneously to bias the unilateral conductors to arrest current flow therethrough upon its energization and in its other state of operation to permit current to flow through one or the other of the unilateral conductors.

6. In color television apparatus wherein an image is projected upon a storage-type camera tube to provide thereon color representations in each of a plurality of cyclically repeating color sequences when scanned, and wherein during scanning tracking information relative to the rate of scanning is obtainable from the output signal developed, the combination comprising means to derive from the output signal a signal representative of the instantaneous rate of scanning, means to compare said signal with one indicative of controlled phase and optimum rate of scanning, means to modify the scanning rate with departures in the instantaneously obtained signal from the optimum to cause the instantaneous scanning rate substantially to correspond to the optimum scanning rate, means operative only at time periods when the signal strength is less than an established threshold value for discontinuing the control by the comparison signal resulting from the instantaneous and optimum rates of scanning, and means effective during periods of interruption of the control by the comparison signals to maintain the scanning rate substantially coinciding with that effective at the commencement of the interruption by the comparison signal, said means including a circuit to maintain the effect during control interruption by recirculating the effective control signal from the previous scanning line.

7. In color television apparatus wherein an optical image is projected upon a storage-type camera tube through a strip-type color filter to develop on the target indications of color representations in each of a cyclically repeating color sequence and, when scanned, to develop a video signal train indicative of information as to all of image detail, color and the rate of scanning, the combination comprising means to derive from the video signals an indication of the instantaneous rate of scanning, means to develop a signal indicative of the optimum rate of scanning with controlled phase, means to discriminate one of said signals against the other to obtain a control signal indicative of the departure of the actual rate of scanning in either the fast or slow tracing relative to the optimum rate, means to modify the instantaneous scanning rate under control of the developed signals indicating departures in the instantaneously obtained signal from the optimum to cause the instantaneous scanning rate to approach the optimum scanning rate, means operative only at time periods when the tracking signal strength is less than an established threshold value for arresting the control of the scanning rate by the comparison signal indicative of the relationship between the instantaneous and optimum rates of scanning, and means operative during periods of arrest of the control by the comparison signal to maintain the scanning rate during periods of tracking signal decrease below the threshold at a time substantially coinciding with that of the comparison at the time of control interruption.

8. The control circuit claimed in claim 7 comprising, in addition, a storage memory circuit to maintain the scanning rate at substantially the optimum.

9. The control circuit claimed in claim 8 comprising, in addition, means to recirculate the scanning control signal so that during periods of arrest of the comparison control the scanning is maintained substantially constant.

10. A switching circuit comprising a pair of diodes having the cathode of the first connected to the anode of the second, a load circuit connected to the junction of the connected anode and cathode elements, a plurality of pentode tubes each connected to receive at its input the same signal, a connection to supply signal output from one pentode to the anode of the first diode and a connection to supply signal output from the other pentode to the cathode of the second diode so that for one polarity of signal input to the pentodes one diode is adapted to conduct and for the opposite polarity of signal input to the pentodes the other diode is adapted to conduct, a gating tube having its output circuit connected between the outputs of each high impedance signal source, and means to control the operative and inoperative periods of the gating tube so that for one state of operation of the gating tube one or the other of the diode elements conducts and passes current in accordance with the signal input polarity to the pentodes and for the other state of operation of the gating tube a bias voltage is applied simultaneously to each diode to arrest current flow through each of the diodes.

11. In color television apparatus wherein there is included a storage-type camera tube upon which there is adapted to be projected an image of a scene divided into the component colors of an additive color combination and wherein there is also provided means to introduce upon the camera tube light and shadow effects to provide, with scanning, tracking information relative to the camera tube, circuits for compensating for saturating effects within the camera tube under conditions of extreme high light intensity introducing saturation effects thereon with resulting insensitivity to superimposed tracking information comprising the combination of means for deriving from the camera tube output signals indicative of the rate of image tracking within the tube for average conditions of illumination, means for deriving from a second source signals indicative of an optimum tracking rate within the tube, means for discriminating the said two signals against each other for obtaining an output control voltage indicative of tracking rate departures from optimum in either a direction of increased or decreased instantaneous speed, a pair of switching diodes having the cathode of one connected to the anode of the other, an output circuit connected to the junction of the connected anode and cathode elements, a pair of high impedance sources each adapted to receive the discriminate control voltage at its input, means to supply the output of one high impedance source to the cathode of one diode, means to supply the output of the other high impedance source to the anode of the other diode so that for conditions indicating a departure in tracking rate from optimum one of the other of the diodes is adapted to draw current, memory circuit including a condenser connected to be charged by the current flowing through the diodes, said memory circuit having a time constant of the order of the time period normally to scan one line of an image, means to control the scanning rate and thus the tracking rate within the camera tube in accordance with the charge acquired by the condenser of the memory circuit as a result of current flow through the diodes, a gating tube having a low internal impedance relative to the signal input source connected in parallel to the high impedance input signal sources, a bi-stable triggering circuit connected to receive a signal input from the derived tracking rate signal and adapted to assume one state of operation for a tracking signal intensity from the camera tube exceeding an established threshold value and its second state of operation with a camera tube output tracking signal below the threshold value at time periods of extreme high lights of illumination on the camera tube, said gating tube being maintained in a state of operation during an illumination of the camera tube of insufficient brilliance to reduce the tracking output signal below the selected threshold to permit the said diodes conduct in accordance with the conduction within the said high impedance sources, and means responsive to the state of operation of the bi-stable triggering circuit corresponding to low intensity output tracking signals from the camera tube for transferring the gating tube operation to a state opposite that for tracking signal intensity above the threshold, said second state being adapted concurrently to carry both diodes to an inoperative state, whereby tracking control within the camera tube is maintained during the inoperative period of the diodes under control of the state of charge assumed by the memory time constant circuit during periods of camera tube output signals above the threshold value.

12. The circuit claimed in claim 11 comprising, in addition, a cathode follower tube connected between the output of each high impedance source and the therewith associated diode for supplying control potentials to said diodes.

13. The circuit claimed in claim 12 comprising, in addition, means for deriving from the camera tube output additional signals indicative of departures of the scanning operation from optimum color phase, means for gating said developed signals during selected portions of each line scanning period, a time constant circuit having time constant which is long compared to a line scanning period connected to be charged by the gate developed phasing control signal, a mixer circuit connected to be supplied at the signals indicative of each of the optimum phase and tracking information and means to control the tracking rate by the combined tracking and phasing signals.

14. The circuit claimed in claim 13 comprising, in addition, means for recirculating the mixer output so that predominately at periods of camera signal, output below the threshold value the control of tracking is sustained.

15. The circuit claimed in claim 14 wherein the gating tube has its control electrode connected to the triggering circuit and its anode and cathode elements connected respectively to the control electrodes of one of the cathode follower tubes.

References Cited in the file of this patent

UNITED STATES PATENTS

| | | |
|---|---|---|
| 2,458,156 | Fredendall | Jan. 1, 1945 |
| 2,547,890 | Rubin | Apr. 3, 1951 |
| 2,563,902 | Yost | Aug. 14, 1951 |
| 2,622,193 | Clayden | Dec. 16, 1952 |
| 2,632,104 | Lakatos | Mar. 17, 1953 |
| 2,634,326 | Goodrich | Apr. 7, 1953 |
| 2,705,258 | Lesti | Mar. 29, 1955 |